United States Patent
Sawamoto et al.

(10) Patent No.: US 8,815,384 B2
(45) Date of Patent: Aug. 26, 2014

(54) AROMATIC POLYAMIDE POROUS FILM AND SEPARATOR FOR CAPACITOR OR BATTERY USING THE SAME

(75) Inventors: Atsushi Sawamoto, Otsu (JP); Kenta Nishibara, Otsu (JP); Akimitsu Tsukuda, Otsu (JP)

(73) Assignee: Toray Industries, Inc. (JP)

( * ) Notice: Subject to any disclaimer, the term of this patent is extended or adjusted under 35 U.S.C. 154(b) by 0 days.

(21) Appl. No.: 13/519,609

(22) PCT Filed: Dec. 3, 2010

(86) PCT No.: PCT/JP2010/071678
§ 371 (c)(1),
(2), (4) Date: Jun. 28, 2012

(87) PCT Pub. No.: WO2011/089785
PCT Pub. Date: Jul. 28, 2011

(65) Prior Publication Data
US 2012/0308898 A1    Dec. 6, 2012

(30) Foreign Application Priority Data

Jan. 25, 2010  (JP) ................................. 2010-012763
Jun. 30, 2010  (JP) ................................. 2010-148786

(51) Int. Cl.
  *B32B 3/26*      (2006.01)
  *H01M 2/16*      (2006.01)
  *C08J 5/22*      (2006.01)
  *H01G 9/02*      (2006.01)
  *H01G 11/52*     (2013.01)
  *C08L 77/10*     (2006.01)
  *H01M 10/0525*   (2010.01)

(52) U.S. Cl.
  CPC ............... *H01G 9/02* (2013.01); *C08J 2439/06* (2013.01); *H01M 10/0525* (2013.01); *C08J 5/2256* (2013.01); *Y02E 60/12* (2013.01); *Y02E 60/13* (2013.01); *H01M 2/1653* (2013.01);

*C08J 2377/00* (2013.01); *H01G 11/52* (2013.01); *C08L 77/10* (2013.01)
USPC ..................... 428/315.7; 428/315.5; 521/139; 429/254

(58) Field of Classification Search
USPC ........... 428/315.5, 315.7; 210/500.38, 500.27
See application file for complete search history.

(56) References Cited

U.S. PATENT DOCUMENTS 7,866,487 B2 *  1/2011  Sueoka et al. ........... 210/500.38

FOREIGN PATENT DOCUMENTS

| JP | 5-335005 A | 12/1993 |
|---|---|---|
| JP | 7-037571 A | 2/1995 |
| JP | 7-078608 A | 3/1995 |
| JP | 2001-023600 A | 1/2001 |
| JP | 2001-057201 A | 2/2001 |
| JP | 2003-347166 A | 12/2003 |
| JP | 2004-182919 A | 7/2004 |
| JP | 2006-257397 A | 9/2006 |
| JP | 2007-305574 A | 11/2007 |
| WO | WO 2006087859 A1 * | 8/2006 |

OTHER PUBLICATIONS

Translation of JP 2005-162885, Tsuyumoto et al., Jun. 23, 2005, 12 pages.*

* cited by examiner

*Primary Examiner* — Hai Vo
(74) *Attorney, Agent, or Firm* — DLA Piper LLP (US)

(57) ABSTRACT

A porous film includes aromatic polyamide as a constituent component that has high heat resistance, high air permeability and high affinity to electrolytes. It is a porous aromatic polyamide film including aromatic polyamide and a hydrophilic polymer, wherein the hydrophilic polymer accounts for 12 to 50 parts by mass per 100 parts by mass of the aromatic polyamide, the thickness being 2 to 30 micrometers, the Gurley air permeability being 0.5 to 300 seconds/100 ml, and the thermal shrinkage rate being −0.5 to 1.0% at 200° C.

14 Claims, No Drawings

AROMATIC POLYAMIDE POROUS FILM AND SEPARATOR FOR CAPACITOR OR BATTERY USING THE SAME

RELATED APPLICATIONS

This is a §371 of International Application No. PCT/JP2010/071678, with an international filing date of Dec. 3, 2010 (WO 2011/089785 A1, published Jul. 28, 2011), which is based on Japanese Patent Application Nos. 2010-012763, filed Jan. 25, 2010, and 2010-148786, filed Jun. 30, 2010, the subject matter of which is incorporated by reference.

TECHNICAL FIELD

This disclosure relates to a porous aromatic polyamide film, particularly to an aromatic polyamide film that can be used effectively as separator for electric storage devices such as capacitors and batteries.

BACKGROUND

Capacitors such as lithium ion capacitor are applied to uses such as auxiliary power source for various types of equipment and regenerative energy storage, including the use for the buffer of wind power generation modules, since they are excellent in power density, safety, and cycle properties, and also have a long life.

A separator for capacitors is generally subjected to heat treatment during the manufacturing process for the purpose of removing water, and it is necessary to increase the processing temperature for improvement of quality and productivity. Moreover, when it is mounted implemented on a circuit board, for example, it needs to pass through a soldering step using the reflow soldering method, and therefore, an enhanced heat resistance is now called for. Further, to provide capacitors with high output, the separators are required to have properties such as low resistance and reduced thickness at the same time.

On the other hand, also in nonaqueous secondary batteries such as lithium ion secondary battery, separators with increased heat resistance, low electrical resistance, and reduced thickness are now called for since there are increasing demands for products with increased capacitance, output, and size, as well as improved safety.

To meet the requirement for increased heat resistance, there has been a proposal of a separator consisting of a heat-resistant layer on one side or both sides of a microporous film which comprises a low melting point resin such as polyolefin (e.g., see Japanese Unexamined Patent Publication (Kokai) No. 2001-23600). However, although such a separator has shutdown property, there are problems such as inability to resist the use in a high temperature atmosphere, which is requited for in batteries with an increased size or a larger number of incorporated cells, and unsuitability for high heat treatment during the battery production process. Moreover, since it is inferior to single-film heat-resistant separators in terms of heat resistance, and tends to cause a short circuit in the end portion due to thermal contraction during abnormal heating, this problem becomes more remarkable with batteries with an increased size, specifically, those with an increased surface. In addition, reduction in thickness is generally difficult because of their laminated structure.

Thus, since aromatic polyamides are substantially free from a melting point, and have high heat resistance, it has been proposed to simply use a nonwoven fabric or paper-like sheet of aromatic polyamide fiber as separator unit (e.g., see Japanese Unexamined Patent Publication (Kokai) Nos. Hei 5-335005, Hei 7-37571 and Hei 7-78608). However, it is difficult to industrially produce uniform nonwoven fabrics or paper-like sheets having a sufficient strength as well as a small thickness of 50 μm or less.

On the other hand, to reduce the resistance of a separator, it is effective to improve the affinity between the separator and an electrolyte, in addition to reducing the thickness and increasing the permeability, and Japanese Unexamined Patent Publication (Kokai) No. 2003-347166 has proposed a separator with affinity developed by carrying out plasma treatment for nonwoven fabrics of aromatic polyamide or the like. However, the plasma treatment method has problems such as rapid deterioration in hydrophilicity over time, inability to improve the surface of pores in the film, and breakage of molecular chains due to plasma irradiation to cause a decrease in the strength of the film.

As mentioned above, there is increasing demands for separators having reduced thickness, high heat resistance, high air permeability and good affinity to electrolytes.

It could therefore be helpful to provide a porous film comprising an aromatic polyamide as a constituent component and having a reduced thickness, excellent heat resistance, high air permeability and good affinity to electrolytes, as well as separators for capacitors and batteries produced therefrom.

SUMMARY

We thus provide:
1. A porous aromatic polyamide film comprising aromatic polyamide and a hydrophilic polymer wherein the hydrophilic polymer accounts for 12 to 50 parts by mass per 100 parts by mass of the aromatic polyamide, the Gurley air permeability being 0.5 to 300 seconds/100 ml, and the thermal shrinkage rate being −0.5 to 1.0% at 200° C. in both the length and the width direction.
2. A porous aromatic polyamide film according to paragraph 1 wherein the hydrophilic polymer accounts for 15 to 50 parts by mass per 100 parts by mass of the aromatic polyamide, the Gurley air permeability being 0.5 to 100 seconds/100 ml.
3. A porous aromatic polyamide film according to either paragraph 1 or 2 having a thickness of 2 to 30 μm.
4. A porous aromatic polyamide film according to any one of paragraphs 1 to 3 having an electrolyte retention rate of 400 to 700%.
5. A porous aromatic polyamide film according to any one of paragraphs 1 to 4, wherein the hydrophilic polymer is polyvinyl pyrrolidone having a weight-average molecular weight of 200,000 to 2,000,000.
6. A separator for capacitors comprising a porous aromatic polyamide film according to any one of paragraphs 1 to 5.
7. A capacitor comprising a separator for capacitors according to paragraph 6.
8. A separator for batteries comprising a porous aromatic polyamide film according to any one of paragraphs 1 to 5.
9. A battery comprising a separator for batteries according to paragraph 8.

As described below, it is possible to obtain a porous film that is adequately high in heat resistance during manufacturing steps at high temperatures, such as reflow soldering and heat treatment, in a high temperature atmosphere, and in the case of abnormal heat generation, and has a small thickness, high permeability, and high affinity to electrolyte solutions, thereby serving effectively as separators with high heat resistance and low electrical resistance that are suitable for capacitors such as lithium ion capacitor and electric double layer capacitor, and for batteries such as lithium ion secondary battery.

DETAILED DESCRIPTION

Preferable aromatic polyamides that can be used include, for example, those having a repeating unit as represented by the following formula (1) and/or formula (2):

Chemical Compound 1

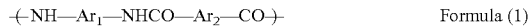  Formula (1)

Chemical Compound 2

  Formula (2)

Here, examples of groups $Ar_1$, $Ar_2$ and $Ar_3$ include the following:

Chemical Compound 3

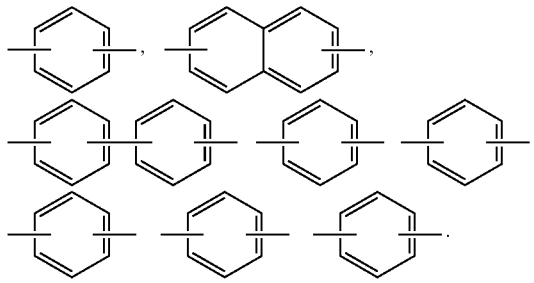

Groups X and Y may be selected from, but not limited to, the following: —O—, —$CH_2$—, —CO, —$CO_2$—, —S—, $SO_2$—, and —$C(CH_3)_2$—.

Further, some of the hydrogen atoms in the aromatic rings may be substituted by substituents including, for example, halogen groups such as fluorine, bromine and chlorine (preferably chlorine); nitro group; alkyl groups such as methyl group, ethyl group and propyl group (preferably methyl group); alkoxy groups such as methoxy group, ethoxy group and propoxy group. Furthermore, the hydrogen atoms in the amide bonds existing in the polymers may also be substituted by other substituents.

In an aromatic polyamide, it is preferred that the aromatic rings with para orientation as mentioned above account for 80 mol % or more, more preferably 90 mol % or more, of the total aromatic rings. The "para orientation" referred to herein means a state where the divalent bonds existing in the main chain of an aromatic ring are coaxial or parallel to each other. If aromatic rings having para orientation account for less than 80 mol %, the film may be poor in the Young's modulus, breaking strength, thermal shrinkage rate, and formability.

The porous aromatic polyamide film (hereinafter, occasionally referred to simply as "porous film") contains an aromatic polyamide and a hydrophilic polymer, and the hydrophilic polymer accounts for 12 to 50 parts by mass per 100 parts by mass of the aromatic polyamide. If the hydrophilic polymer content is less than 12 parts by mass, the wettability and retention of an electrolyte solution on the porous film can suffer from deterioration or the like. In the case of using the porous film as a separator for capacitors or batteries, if the wettability or retention of an electrolyte solution on the a separator are poor, penetration of the electrolyte solution can take time, and not only the productivity can decrease, but also the ionic conductivity between electrodes can be prevented in areas where liquid is not retained sufficiently, leading to an increase in the internal resistance and causing adverse effect directly on the performance such as charge and discharge properties and life. Moreover, if it is used in a lithium-ion battery, lithium will be stored in the negative electrode during charging to expand the electrode, which in turn presses the separator. In particular, if a negative-electrode material such as Si and Sn-based alloys that can store lithium heavily is used, the electrode will suffer from a large volume expansion, and therefore, a higher electrolyte retention rate will be required. Containing a predetermined amount of hydrophilic polymer, the porous film will have an improved affinity with electrolytic solutions, resulting in a separator with low electrical resistance and a high electrolyte retention rate. On the other hand, if the hydrophilic polymer content is more than 50 parts by mass, the porous film may increase in water absorption or decrease in heat resistance and strength. Further, when used as a separator, the hydrophilic polymer may be eluted into the electrolyte solution. To eliminate adverse effect on the properties of the storage device and improve the affinity with the electrolyte solution, it is preferred that the content is 15 to 50 parts by mass, more preferably 15 to 40 parts by mass, most preferably 20 to 40 parts by mass per 100 parts by mass if the aromatic polyamide.

Preferable hydrophilic polymer which can be used include polymers soluble in an aprotic organic polar solvent as described later that contains a polar substituent, particularly one or more substituents selected from the group consisting of hydroxyl group, acyl group and an amino group, because the effect of enhancing the hydrophilicity of a porous film can be achieved easily and also because the affinity with electrolytes can be further improved. Such hydrophilic polymers include, for example, polyethylene glycol, polyvinyl alcohol, and polyvinyl pyrrolidone (hereinafter, also referred to as PVP), of which the use a PVP polymer, which has good compatibility with aromatic polyamide, is preferable because its elution into an electrolyte solution can be prevented when it is used as a separator under conditions where the content of the hydrophilic polymer in the porous film is maintained in our specified range. Further, it is preferred that the PVP polymer has a weight-average molecular weight of 200,000 to 2,000,000. If the weight-average molecular weight is less than 200,000, the polymer will be extracted into water when introduced into a water bath during the film-forming process, possibly causing the content of the hydrophilic polymer in the porous film to decrease less than our specified range. Moreover, if a low molecular weight PVP polymer remains in the porous film, there is a risk that the PVP polymer may be dissolved into the electrolyte solution, or the heat resistance of the porous film may be reduced when it is used as a separator. If the weight-average molecular weight exceeds 2,000,000, the viscosity of the film forming solution can increase, possibly leading to a decrease in productivity and air permeability. It is most preferable that the hydrophilic polymer is a PVP polymer having a weight-average molecular weight of 500,000 to 1,500,000 since it can prevent the PVP polymer from being eluted into the electrolyte solution, and serves to control the content of the hydrophilic polymer in the porous film as well as the heat resistance and air permeability.

It is preferred that the porous aromatic polyamide film has a thickness of 2 to 30 µm, more preferably 5 to 20 µm. If the thickness is less than 2 µm, the strength may not be sufficient, possibly leading to breakage of the film during processing, and a short circuit between electrodes when used as a separator. If the thickness is more than 30 µm, the internal resistance can increase when used as a separator, and size reduction of devices can become difficult.

It is preferred that the porous aromatic polyamide film has a Gurley air permeability of 0.5 to 300 seconds/100 ml. It is more preferably 0.5 to 200 seconds/100 ml, and further preferably 0.5 to 100 seconds/100 ml. If the Gurley air permeability is smaller than 0.5 seconds/100 ml, the strength can decline largely, and if it is larger than 300 seconds/100 ml, the resistance to air and liquid penetration can increase, when used as a separator, causing the internal resistance to increase and failing to develop sufficient properties. To keep the Gurley air permeability within the above mentioned range, it is preferred that the content of the hydrophilic polymer in the film forming solution, the temperature and humidity conditions during the process of forming a porous, and the wet bath temperature are kept within the ranges mentioned below. Note that the Gurley air permeability is defined as the time required for 100 cc of air to pass through and measured by the method specified in JIS-P8117 (1998), and a smaller Gurley air permeability value indicates that the porous film has a higher air permeability.

It is preferred that the porous aromatic polyamide film has a thermal shrinkage rate of −0.5 to 1.0%, more preferably 0.0 to 1.0%, at 200° C. in both the length direction (MD) and the width direction (TD). If it is more than 1.0%, the separator can shrink to clog the pores or to cause short-circuiting during heat treatment and reflow soldering in the manufacturing process of a device. Moreover, the separator can shrink to cause short-circuiting in the case where the device is used at a high temperature, stores heat after use for a long time, and also undergoes generation of excessive heat. It is more preferred that the thermal shrinkage rate at 200° C. is −0.5 to 0.5% from the viewpoint of productivity and safety. To maintain the thermal shrinkage rate within the range in the porous aromatic polyamide film, the para-orientated aromatic rings of the aromatic polyamide preferably account for 80 mol % or more of the total aromatic rings, and in addition, it is preferred that the hydrophilic polymer used has a molecular weight and content within our specified range. Further, it is preferred that a heat treatment step and a stretching/relaxing step are carried out under the undermentioned conditions.

It is preferred that the porous aromatic polyamide film has an electrolyte retention rate of 400 to 700%, more preferably 500 to 700%. In the case where the electrolyte retention rate is less than 400%, the internal resistance can increase, and the charge/discharge properties can decrease, due to blocking of ionic conduction between electrodes when used as a separator. In addition, a shortage of electrolyte solutions can occur in some portions during repeated charging and discharging, leading to a shorter life. Especially when used in a lithium ion battery incorporating a next-generation negative electrode material of a high lithium storage type, a higher electrolyte retention rate will be required since the volume expansion of the electrode increases to compress the separator during charging. To keep the electrolyte retention rate within the region, it is preferred that the porous aromatic polyamide film contains a hydrophilic polymer within our specified content range.

It is preferred that the porous aromatic polyamide film has an average pore size of 0.4 to 5 µm as measured by the mercury penetration method. In the case where the average pore size is less than 0.4 µm, the film will have an increased resistance to air and liquid penetration, and will suffer from an increased internal resistance when used as a separator. In the case where the average pore size is more than 5 µm, the film will lose strength, and suffer from short-circuiting between electrodes when used as a separator. To obtain a porous film having a sufficient strength and a low electrical resistance, it is preferred that the content of the hydrophilic polymer in the film forming solution, and the wet bath temperature are kept within the ranges mentioned below.

It is preferred that the porous aromatic polyamide film has a breaking strength of 20 MPa or more at least in one direction. In the case where the breaking strength is less than 20 MPa, the film may break and the productivity is reduced due to high tension, tension fluctuations and so on during processing. To ensure better productivity, it is preferred that the strength is 50 MPa or more, more preferably 100 MPa or more. Although no upper limit is particularly specified, it is generally limited to approximately 1 GPa in the case of a porous film. To maintain the breaking strength in the above range for the aromatic polyamide, aromatic rings having para-orientation preferably account for according 80% or more of the total aromatic rings. Moreover, it is preferred that the content of the hydrophilic polymer does not exceed our specified range. Further, it is preferred a heat treatment step and a stretching/relaxing step are carried out under the undermentioned conditions.

It is preferred that the porous aromatic polyamide film has a Young's modulus of 300 MPa or more at least in one direction. If the Young's modulus is high, good handleability can be maintained during processing even if the thickness is decreased. For easy thickness reduction, it is preferred that the Young's modulus is 500 MPa or more, more preferably 1 GPa or more. Although no upper limit is particularly specified, it is generally limited to approximately 10 GPa in the case of a porous film. To maintain the Young's modulus within the range for the aromatic polyamide, aromatic rings having para-orientation preferably account for according 80% or more of the total aromatic rings. Moreover, it is preferred that the content of the hydrophilic polymer does not exceed our specified range.

It is preferred that the porous aromatic polyamide film has an elongation at break of 5% or more in both the length direction and the width direction. If the elongation is high, breakages of film can be reduced, and processing can be performed at a high speed. In addition, the film can closely follow the expansion and contraction of electrodes during charging and discharging without breakage, and production of devices with durability and safety can be ensured. To improve the processability, durability and safety, it is preferred that the elongation is 10% or more, and more preferably 15% or more. Although no upper limit is particularly specified, the elongation is generally limited to approximately 200% in the case of a porous film. To maintain the elongation at break within the range, it is preferred that a heat treatment step and a stretching/relaxing step are carried out. Especially it is preferred that heat treatment is performed in two steps at different temperatures under the undermentioned conditions.

Further, for the purpose of reducing the coefficient of static friction of the porous aromatic polyamide film, inorganic particles or organic particles may be added to produce protrusions on the surface. Examples of inorganic particles include, for example, wet and dry silica, colloidal silica, aluminum silicate, titanium oxide, calcium carbonate, calcium phosphate, barium sulfate, alumina, magnesium carbonate, zinc carbonate, titanium oxide, zinc oxide (zinc white), antimony oxide, cerium oxide, zirconium oxide, tin oxide, lanthanum oxide, magnesium oxide, barium carbonate, zinc carbonate, basic lead carbonate (lead white), barium sulfate, calcium sulfate, lead sulfate, zinc sulfate, mica, titanium mica, talc, clay, kaolin, lithium fluoride, and calcium fluoride. Examples of organic particles include, for example, particles obtained by crosslinking a polymer compound with a crosslinking agent. Examples of such crosslinked particles include crosslinked particle of a polymethoxysilane based compound, crosslinked particles of a polystyrene based compound, crosslinked particles of an acryl based compound, crosslinked particles of a polyurethane based compound, crosslinked particles of a polyester based compound, crosslinked particles of a fluoride based compound, and mixtures thereof.

Especially preferred among the above mentioned particles are silica particles since high durability against electrolyte solutions is ensured in the case of the use as a separator.

It is preferred that the above mentioned inorganic particles and organic particles are spherical, and have an average particle diameter in the range of 15 nm to 2 μm. If the average particle diameter is less than 15 nm, protrusions may not formed sufficiently, and the coefficient of static friction may increase, leading to a reduction in the slip property of the film, whereas if the average particle diameter exceeds 2 μm, particles may drop and the coefficient of static friction may decrease, leading to easy slipping to cause weaving and wrinkling.

It is preferred that the above mentioned inorganic particles and organic particles account for 0.02 to 4 weight % relative to the total solids in the film forming solution. If the content is less than 0.02 weight %, the protrusions may not be formed sufficiently, and the coefficient of static friction may increase, leading to a reduction in the slip property of the film, whereas if the content exceeds 4 weight %, the particles may drop and the elongation of films may decrease.

Next, the method for producing the porous aromatic polyamide film is explained below.

First, if the aromatic polyamide is to be produced from, for example, acid chloride and diamine, the available methods include synthesis by solution polymerization in an aprotic organic polar solvent such as N-methyl-2-pyrrolidone, N,N-dimethylacetamidem and dimethylformamide, and synthesis by interfacial polymerization and the like using an aqueous media. In particular, solution polymerization in an aprotic organic polar solvent is preferred since the molecular weight of the polymer can be controlled easily.

In the case of solution polymerization, for obtaining a polymer having a molecular weight required to provide a self-supporting films, it is preferred that the water content in the solution used for polymerization is 500 ppm or less (by mass, the same shall apply hereinafter), more preferably 200 ppm or less. Since a polymer with an ultra high molecular weight tends to be produced when acid chloride and diamine are used in equal amounts, not to mention having high purity, it is preferred that the molar ratio of either of them to the other is adjusted 97 to 99.5%, more preferably 98 to 99%. In addition, it is preferred that the temperature of the solution during polymerization is kept at 40° C. or less, although polymerization reaction of aromatic polyamide is accompanied by heat generation. If the temperature of the solution during polymerization exceeds 40° C., side reaction can occur, and the polymerization degree may not increase sufficiently. More preferably, the temperature of the solution during polymerization is kept at 30° C. or less. Further, hydrogen chloride is produced as a byproduct accompanying the polymerization reaction, and if this is to be neutralized, it is preferred to use an inorganic neutralizer such as calcium hydroxide, calcium carbonate, and lithium carbonate or an organic neutralizer such as ethylene oxide, propylene oxide, ammonia, triethylamine, triethanolamine, and diethanolamine. For obtaining the porous aromatic polyamide film, it is preferred that the intrinsic viscosity $\eta_{inh}$ of the polymer (a value measured 30° C. for a 100 ml solution prepared by dissolving 0.5 g of the polymer in 98 weight % sulfuric acid) is 0.5 (dl/g) or more since the porous film obtained will have high handleability.

The film forming solution for the porous aromatic polyamide film may also be obtained by mixing a hydrophilic polymer with the aromatic polyamide polymer solution after its neutralization or by isolating the aromatic polyamide polymer followed by re-dissolving it, along with a hydrophilic polymer, in an aprotic organic polar solvent. It is preferred that the total content of the aromatic polyamide polymer and the hydrophilic polymer in the film forming solution is 5 to 30 weight %. A more preferred range is 8 to 25 weight %, still more preferably 10 to 20 weight %, since a thin, stable porous film can be produced efficiently. Moreover, it is preferred that the hydrophilic polymer in the film forming solution accounts for 10 to 200 parts by mass per 100 parts by mass of the aromatic polyamide. The hydrophilic polymer not only remains in the final porous film to improve its affinity with the electrolyte solution, but also plays a role for inhibiting aggregation of aromatic polyamide molecules to control the pore structure during the production of a porous film from the film forming solution. If the content of the hydrophilic polymer in the film forming solution is less than 10 parts by mass, the effect of improving the affinity with the electrolyte will not be obtained due to a reduced amount of the hydrophilic polymer remaining in the porous film, or the pore structure will not be controlled due to aggregation of aromatic polyamide molecules during the production of a porous film, failing to maintain the Gurley air permeability in our specified range. If the content of the hydrophilic polymer in the film forming solution is more than 200 parts by mass, a porous film may not be produced due to an excessively high viscosity of the film forming solution, or the heat resistance and the strength may be reduced due to an increased amount of the hydrophilic polymer remaining in the porous film. The remaining hydrophilic polymer, furthermore, may be eluted into the electrolyte solution.

The film forming solution prepared as described above is processed into a porous film by the so-called "solution film formation" process. Solution film formation processes include dry-wet, wet, and precipitation type ones, and any one of them may be used for forming a film, but when using aromatic polyamide in which aromatic rings with para-orientation account for 80% or more of the total aromatic rings, the use of a precipitation type method for film formation is more preferable because the size of surface pores and the internal structure of the porous film can be easily controlled to maintain the Gurley air permeability and the average pore size in our specified range.

In the case where a porous film is produced by the precipitation method, the film forming solution is first cast into a film-like shape on a support, such as an endless belt, drum or film, using a die or die coater. Then, a porous film is produced. The methods available for porous film formation include causing the layer to absorb water and precipitate in a controlled temperature and humidity atmosphere, and lowering the solubility of the polymer by cooling it to cause phase separation or precipitation. More preferred among them is the method of causing the layer to absorb water in a controlled temperature and humidity atmosphere, to keep a water soluble polymer within our specified range and form a uniform porous structure in a shorter period of time in spite of the difficulty in controlling the solubility of aromatic polyamide.

In performing the method of causing the layer to absorb water in a controlled temperature and humidity atmosphere, it is preferred that the temperature of the atmosphere is 20 to 90° C., and the relative humidity is 50 to 95% (RH). If the temperature is 20° C. or less, the absolute humidity is low, and the precipitation of a polymer through water absorption proceeds only mildly. As a result, it may take much time to complete the porous film formation, or the hydrophilic polymers may fail to be incorporated into the porous film, possibly leading to its excessive extraction in a water bath, or its elution into the electrolyte solution. If the temperature exceeds 90° C., dense layers may be formed due to rapid water absorption on the surface, causing the Gurley air permeability to exceed our specified range or causing the formation of through holes. Moreover if the relative humidity is less than 50% RH, a porous structure may not be formed due to drying of the solvent proceeding more rapidly than absorption, whereas if the relative humidity exceeds 95% RH, dense layers may be formed due to rapid water absorption on the surface, possibly leading to a large Gurley air permeability outside our specified range and formation of through holes.

Moreover, it is preferred that the period of time from the casting of the solution onto a support until the completion of the precipitation of a polymer is adjusted to 0.1 to 10 minutes by regulating the prescription of the film forming solution and the conditions for temperature and humidity control atmosphere. If the time period is less than 0.1 minute, the Gurley air permeability may be out of our specified range, whereas if the time period exceeds 10 minutes, the precipitation of the polymer through water absorption proceeds too slowly, possibly failing to allow the hydrophilic polymer to be incorporated in the porous film and causing its excessive extraction in the water bath or its elution into the electrolyte solution.

The aromatic polyamide film that has been made porous is introduced into a wet bath, together with the support or after being peeled off from the support, for removal of the remaining solvent, unincorporated fragment of the hydrophilic polymer, and unnecessary additives such as inorganic salts. Although there are no particular limitations on the bath composition, the use of water or a mixture of an organic solvent and water is preferred from the viewpoint of cost and handleability. Moreover, an inorganic salt may be contained in the wet bath. Elongation may also be carried out at the same time with a draw ratio of preferably 1.02 to 3 times, more preferably 1.05 to 2 times.

It is preferred that the temperature of the wet bath is 30° C. or more to increase the extraction rate of the remaining solvent and suppress the contraction of the pores formed. If the bath temperature is less than 30° C., the average pore size and air permeability may be reduced due to the contraction of internal pores, and the resistance may increase when used as a separator. It is more preferably 50° C. or more, still more preferably 70° C. or more. Although no upper limit is particularly set for the bath temperature, it is effective to maintain the bath temperature below 90° C. in view of the effect of evaporation of water or bubbles formed by boiling. It is preferred that the warming time is 1 to 20 minutes.

The porous film after removal of the solvent is then heat-treated by a tenter or the like. It is preferred that heat treatment is carried out at a high temperature of 220 to 300° C. after predrying at 100 to 210° C. so that the thermal shrinkage rate in the length direction and the width direction at 200° C. is maintained in our specified range without reducing the elongation at break. Predrying is carried out for the purpose of removing the water incorporated inside the polymer before heat treatment at a high temperature. If the temperature of predrying is less than 100° C., water inside the polymer will not be removed, and mechanical properties such as elongation at break may decrease as a result of water bumping and bubbling during heat treatment at a high temperature in the next process. On the other hand, if the temperature exceeds 210° C., mechanical properties such as elongation at break may decrease due to bumping and bubbling of the internal water during predrying. A higher drying temperature is preferable within the region described above, and more preferably it is 150 to 210° C. Moreover, it is most preferable that predrying is carried out at or above the glass transition temperature of the hydrophilic polymer (for example, 180° C. or more in the case of using PVP) since water contained inside is removed effectively, preventing the deterioration in mechanical properties even if high-temperature heat treatment is carried out in the next step. Especially, since the porous film contains a large amount of a hydrophilic polymer, it has a high affinity with water molecules and tends to incorporate water easily. On the other hand, it is preferred that the final temperature of heat treatment is 220° C. or more to keep the thermal shrinkage rate at 200° C. within our specified range in both the length and the width direction. This predrying process is important for the above reasons. It is preferred that the high-temperature heat treatment following the predrying is carried out at 220 to 300° C. If the temperature of the heat treatment is less than 220° C., the thermal shrinkage rate at 200° C. increases in both the length and the width direction. The thermal shrinkage rate decreases with an increasing temperature of heat treatment, but if the temperature of heat treatment exceeds 300° C., mechanical properties such as elongation at break may decrease due to degradation of the polymer. Heat resistance to high temperatures can be obtained without reducing the elongation at break if predrying and heat treatment are carried out in combination under these conditions.

Moreover, at this time, elongation and relaxation in the width direction may be carried out, and in particular, performing a relaxation step is preferred since it is effective in improving the elongation at break of a porous film and maintaining the thermal shrinkage rate at 200° C. within our specified range in the length and width directions. In addition, to enhance the effect, it is preferred that relaxation is carried out in the latter stage of the heat treatment step after adequate evaporation of water.

The porous aromatic polyamide film not only has excellent heat resistance and reduced thickness, but also has high affinity with electrolyte solutions and stability in electrolyte solutions, and accordingly, it can be used suitably as separators with heat resistance and electrical resistance, more specifically, as separators for capacitors such as electric double layer capacitor and lithium ion capacitor and for batteries such as lithium ion secondary battery.

EXAMPLES

Methods for Measuring Physical Properties and Methods for Evaluating Effects

The methods for measuring physical properties and methods for evaluating effects for the examples were as follows.
(1) Content of Hydrophilic Polymer A low angle laser light scattering photometer (LALLS) and a differential refractometer (RI) were incorporated into a gel permeation chromatograph (GPC), and the molecular weight and content of the solute were sequentially calculated based on the light scattering intensity of a solution size-fractionated in the GPC, measured continuously over the elution period. Identification of components with different molecular weights was performed by structural analysis using a combination of nuclear magnetic resonance (NMR) and Fourier transform infrared spectroscopy (FT-IR). The measuring conditions used are described below. Note that in the Examples, the content of the hydrophilic polymer is defined as its content (parts by mass) per 100 parts by mass of the aromatic polyamide.

A. GPC
Device: Model 244 gel permeation chromatography (manufactured by Waters Corporation)
Column: TRC-GM (two columns) (manufactured by Toray Research Center, Inc.)
 Shodex KD-802 (one column) (manufactured by Showa Denko K.K.)
Solvent: NMP (addition of 0.01N lithium chloride)
Flow rate: 0.6 ml/min
Temperature: 23° C.
Samples:
Concentration: 0.101 g of a sample is dissolved per 1 ml of the solvent.
Solubility: complete dissolution
Filtration: Shodex DT ED-13CR (0.45μ) (manufactured by Showa Denko K.K.)
Injected volume: 0.2 ml
Concentration detector: differential refractometer, R-401 (manufactured by Waters Corporation)

B. LALLS
Device: CMX-100 low angle laser light scattering photometer (manufactured by Chromatix, Inc.)
Wavelength: 633 nm (He—Ne)
Second virial coefficient ($A_2$): 0 ml·mole/g
Change in refractive index (dn/dc): 0.215 ml/g (measured value)
Gain: P0=200 mV
Temperature: 23° C.
Filter: 0.45μ Fluoro Pore FP-045 (manufactured by Sumitomo Electric Industries, Ltd.)

C. Data processing: GPC-LALLS data processing system (manufactured by Toray Research Center, Inc.)

D. NMR
Device: GX-270 manufactured by JEOL Ltd.)
Measurement method: $^{13}$C-NMR E. FT-IR
Device: FTS-55A (manufactured by Bio-Rad Laboratories, Inc., Digilab Division)
Measurement method: Permeation method (2) Thickness of Film
The thickness of films was measured by using Peacock Upright Dial Gauge FFA-1 (manufactured by Ozaki Mfg. Co., Ltd.).

(3) Gurley Permeability
Using B-type Gurley Densometer (manufactured by Yasuda Seiki Seisakusho, Ltd.), measurements were made according to the method specified in JIS-P8117 (1998). A porous film sample was clamped to a circular hole with a diameter of 28.6 mm and an area of 645 mm$^2$, and the inner cylinder (inner cylinder weight 567 g) was operated to pass air from the cylinder to outside the cylinder through the test circular hole portion, and the duration required for passage of 100 ml of air was measured to determine the Gurley air permeability.

(4) Thermal Shrinkage Rate
Strips of 10 mm in width and 220 mm in length were cut out from porous films by cutting them in such a manner that the long side agrees with the measuring direction. The positions 10 mm from each end of the long side were marked, and the distance between the marks was defined as $L_1$. A strip was heat-treated in a hot air oven at 200° C. for 30 minutes substantially in a tension-free state, and the distance between the marks was defined as $L_2$, followed by calculation by the formula given below. Five Measurements were made in the length direction and in the width direction of the film, and their averages were calculated.

$$\text{Thermal shrinkage rate}(\%) = ((L_1-L_2)/L_1)\times 100$$

(5) Elongation at Break
A film specimen of 10 mm in width and 150 mm in length was cut out, and subjected to tensile test under the conditions of a chuck-to-chuck distance of 50 mm, a tensile speed of 300 mm/min, a temperature of 23° C., and a relative humidity of 65% using a Robot Tensilon RTA-100 (manufactured by Orientec Co., Ltd.) to determine the elongation at break.

(6) Average Pore Size
The average pore size is determined using the mercury penetration method under the conditions as described below:
Device: PoreSizer 9320 (manufactured by Micromeritics Instrument Corp.)
Mercury penetration pressure: About 3 kPa to 207 MPa
Measured pore diameter: About 7 nm to 500 μm
Measurement mode: pressure increase (penetration) process
Measured cell volume: About 5,000 mm$^3$ or 15,000 mm$^3$
Mercury contact angle: 141.3°
Mercury surface tension: 4.84 N/m.

(7) Stability in Electrolytes
The weight of a porous film sample at a temperature of 23° C. and a relative humidity of 65% RH was defined as $M_1$. This sample was washed adequately with deionized water after being immersed in propylene carbonate for 30 minutes, followed by drying at 120° C. for 2 hours and cooling in an atmosphere of 23° C. and 65% RH, and the measured weight was defined as $M_2$. The rate of change in mass of porous film was calculated by the following equation and the stability in electrolyte was evaluated according to the following criteria. Films rated as O or Δ can work practically.

$$\text{Change in mass}(\%) = ((M_1-M_2)/M)\times 100$$

Stability in Electrolytes
O: Mass change rate is 0% or more and 2% or less.
Δ: Mass change rate is 2% or more and 5% or less.
X: Mass change rate is 5% or more.

(8) Alternating Current Resistance
A porous film sample impregnated with an electrolyte solution was sandwiched between activated carbon electrodes of 10 mm square, and the AC impedance was measured under the conditions of an AC amplitude of 5 mV and frequency range of 0.01 Hz to 1 MHz to determine the separator resistance excluding resistive components such as electrodes. The electrolyte solution used was a 1.0 M propylene carbonate solution of triethyl methyl ammonium tetrafluoroborate.

(9) Electrolyte Retention Rate
A 100 mm square of porous film was used as specimen, and its weight ($W_1$) was measured. Then, it was immersed in a propylene carbonate solution at 23° C. for one minute. Thereafter, the specimen was held at a corner for one minute to remove water naturally, and the weight of the specimen after removal of surplus liquid was measured ($W_2$), followed by calculation of the electrolyte retention rate by the following equation:

$$\text{Electrolyte retention rate}(\%) = ((W_2-W_1)/W_1)\times 100.$$

(10) Comprehensive Evaluation 1
The heat resistance and electrical resistance of a porous film sample were evaluated according to the following criteria:
Heat Resistance
O: Thermal shrinkage rate is −0.5 or more and less than 0.5% in both length and width directions.

Δ: Thermal shrinkage rate is −0.5 or more and less than 1.0% in both length and width directions, but not evaluated as "O"
X: Thermal shrinkage rate is 1.0% or more at least in one direction.

Electrical Resistance

O: Alternating current resistance is 0.0 Ωcm² or more and less than 0.5 Ωcm²
Δ: Alternating current resistance is 0.5 Ωcm² or more and less than 0.7 Ωcm²
X: Alternating current resistance is 0.7 Ωcm² or more.

For comprehensive evaluation of porous film samples to be used as separators of capacitors, the results of these two evaluation tests were combined with those of the test for stability in electrolyte (7) and evaluated according to the following criteria. Films rated as ⊚, O or Δ can work practically.

⊚: O for all three test items
O: Δ for a test and O for the other two of the three test items
Δ: Δ or better for all three test items, but not rated as ⊚ or O.
X: X for one or more of the three test items

(11) Comprehensive Evaluation 2

The liquid retention capability of porous film samples was evaluated according to the following criteria:

Liquid Retention Capability

O: Electrolyte retention rate is 500% or more
Δ: Electrolyte retention rate is 400% or more and less than 500%
X: Electrolyte retention rate is less than 400%.

As in the case of Comprehensive evaluation 1, for comprehensive evaluation of porous film samples to be used as heat resistant separators of lithium ion battery, these results were combined with those of the tests for stability in electrolyte and for heat resistance, and evaluated according to the following criteria. Films rated as ⊚, O or Δ can work practically.

⊚: O for all three test items
O: Δ for a test and O for the other two of the three test items
Δ: Δ or better for all three test items, but not rated as ⊚ or O.
X: X for one or more of the three test items Example 1

In dehydrated N-methyl-2-pyrrolidone (NMP), 2-chloroparaphenylene diamine and 4,4'-diaminodiphenyl ether were dissolved to a content equivalent to 80 mol % and 20 mol %, respectively, relative to the total amount of the diamine, and then 2-chloroterephthaloyl chloride (CTPC) was added to a content equivalent to 98.5 mol % relative to the total amount of the diamine, followed by stirring for 2 hours to complete polymerization, thereby providing a solution of aromatic polyamide. The temperature of the solution was 4° C. at the start of polymerization, and the CTPC was divided into 10 parts, which were added separately at intervals of 10 minutes to maintain the temperature at or below 28° C. during the polymerization. The solution was fed to a mixer along with water, and stirred to precipitate a polymer, which was then taken out. The polymer thus separated was washed with water, dried adequately, and dissolved in NMP, and then PVP with a weight-average molecular weight of 1,000,000 was added in an amount of 100 parts by mass per 100 parts by mass of aromatic polyamide to provide a uniform, completely dissolved film forming solution with a polymer content of 16 mass %. This film forming solution was spread with a die coater to form a layer over a polyethylene terephthalate film, and treated at 45° C. for 2 minutes in humidity-controlled air with a relative humidity of 85% RH until the applied film lost transparency. Then, the opaque film was peeled off, and immersed in a water bath at 80° C. for 2 minutes to extract the solvent. Subsequently, it was predried at 200° C. for one minute in a tenter (heat treatment condition 1) and subjected to high-temperature heat treatment at 230° C. while being allowed to shrink by 5% (draw ratio of 0.95) in the width direction (heat treatment condition 2) to provide a porous film. Major production conditions and evaluation results are shown in Tables 1 and 2, respectively.

Example 2

A porous film was produced according to the same procedure as in Example 1 except that PVP with a weight-average molecular weight of 500,000 was used as hydrophilic polymer. Evaluation results obtained for the porous film are shown in Table 2.

Example 3

A porous film was produced according to the same procedure as in Example 1 except that 50 parts by mass of the hydrophilic polymer was added to the film forming solution so that the polymer content in the forming solution was 12 mass %. Evaluation results obtained for the porous film are shown in Table 2.

Example 4

A porous film was produced according to the same procedure as in Example 1 except that 150 parts by mass of the hydrophilic polymer was added to the film forming solution so that the polymer content in the forming solution was 15 mass %. Evaluation results obtained for the porous film are shown in Table 2.

Example 5

A porous film was produced according to the same procedure as in Example 1 except that except that the application of a film forming solution is followed by treatment at 25° C. for 3 minutes in a humidity-controlled air with a relative humidity of 85% RH. Evaluation results obtained for the porous film are shown in Table 2.

Example 6

A porous film was produced according to the same procedure as in Example 1 except that except that the application of a film forming solution is followed by treatment at 80° C. for 1 minute in a humidity-controlled air with a relative humidity of 85% RH. Evaluation results obtained for the porous film are shown in Table 2.

Example 7

A porous film was produced according to the same procedure as in Example 1 except that the temperature of the water bath was 50° C. Evaluation results obtained for the porous film are shown in Table 2.

Examples 8-12

A porous film was produced according to the same procedure as in Example 1 except that the amount of the hydrophilic polymer to be added to the film forming solution and the polymer content in the film forming solution were as described in Table 1. Evaluation results obtained for the porous film are shown in Table 2.

Examples 13 and 14

A porous film was produced according to the same procedure as in Example 1 except that the weight-average molecular weight of the hydrophilic polymer was as described in Table 1. Evaluation results obtained for the porous film are shown in Table 2.

Examples 15-18

A porous film was produced according to the same procedure as in Example 1 except that the heat treatment conditions were as described in Table 1. Evaluation results obtained for the porous film are shown in Table 2.

Example 19

A porous film was produced according to the same procedure as in Example 1 except that 45 parts by mass of the hydrophilic polymer was added to the film forming solution and that the temperature included in heat treatment condition 2 was 280° C. Evaluation results obtained for the porous film are shown in Table 2.

Examples 20 and 21

A porous film was produced according to the same procedure as in Example 1 except that the content of 4,4'-diamino diphenyl ether in the aromatic polyamide was 50 mol % relative to the total amount of the diamine and that the amount of the hydrophilic polymer to be added to the film forming solution and the polymer content in the film forming solution were as described in Table 1. Evaluation results obtained for the porous film are shown in Table 2.

Example 22

A porous film was produced according to the same procedure as in Example 20 except that the content of 4,4'-diamino diphenyl ether in the aromatic polyamide was 50 mol % relative to the total amount of the diamine, that the amount of the hydrophilic polymer to be added to the film forming solution was 100 parts by mass, that the polymer content in the film forming solution was 20 parts by mass, and that the draw ratio included in heat treatment conditions 2 was 0.90. Evaluation results obtained for the porous film are shown in Table 2.

Comparative Example 1

A porous film was produced according to the same procedure as in Example 1 except that PVP with a weight-average molecular weight of 10,000 was used as hydrophilic polymer. Evaluation results obtained for the porous film are shown in Table 2. Due to a low affinity with the electrolyte solution, the alternating current resistance was large and the liquid retention rate was reduced. Furthermore, due to the presence of PVP with a low molecular weight, the stability in electrolytes slightly deteriorated.

Comparative Example 2

A porous film was produced according to the same procedure as in Example 1 except that PVP with a weight-average molecular weight of 10,000 was used as hydrophilic polymer, and that 400 parts by mass of PVP was added so that the polymer content in the forming solution was 40 mass %. Evaluation results obtained for the porous film are shown in Table 2. Due to the presence of PVP with a low molecular weight, heat resistance and stability in electrolytes largely deteriorated.

Comparative Example 3

A porous film was produced according to the same procedure as in Example 4 except that PVP with a weight-average molecular weight of 40,000 was used as hydrophilic polymer. Evaluation results obtained for the porous film are shown in Table 2. Due to a low affinity with the electrolyte solution, the alternating current resistance was large and the liquid retention rate was reduced. Stability in electrolytes also deteriorated slightly.

Comparative Example 4

A porous film was produced according to the same procedure as in Example 1 except that 250 parts by mass of the hydrophilic polymer was added to the film forming solution so that the polymer content in the forming solution was 28 mass %. Evaluation results obtained for the porous film are shown in Table 2. Due to the presence of PVP remaining in an excessive amount, stability in electrolytes deteriorated and heat resistance also deteriorated slightly.

Comparative Example 5

An aromatic polyamide polymer prepared by the same procedure as in Example 1 was dissolved in NMP, and polyethylene glycol (hereinafter abbreviated as PEG) with a weight-average molecular weight of 300 was added in an amount of 250 parts by mass per 100 parts by mass of the aromatic polyamide to prepare a uniform, completely dissolved film forming solution with a polymer content of 28 mass %. This film forming solution was spread with a die coater to form a layer over a polyethylene terephthalate film, and treated at 10° C. for 10 minutes in humidity-controlled air with a relative humidity of 85% RH until the applied film lost transparency. Then, the same procedure as in Example 1 was carried out to provide a porous film. Evaluation results obtained for the porous film are shown in Table 2. Due to a low affinity with the electrolyte solution, the alternating current resistance was large and the liquid retention rate was reduced.

Comparative Example 6

A porous film was produced according to the same procedure as in Example 1 except that 33 parts by mass of the hydrophilic polymer was added to the film forming solution. Evaluation results obtained for the porous film are shown in Table 2. Due to a low affinity with the electrolyte solution and low air permeability, the alternating current resistance was large and the liquid retention rate was reduced.

Comparative Example 7

A porous film was produced according to the same procedure as in Example 1 except that the temperature included in heat treatment conditions 2 was 200° C. Evaluation results obtained for the porous film are shown in Table 2. Due to a low heat treatment temperature, a large heat contraction occurred at 200° C.

TABLE 1

| | Film forming solution | Hydrophilic polymer in film forming solution | | | Porous film formation conditions | | Water washing conditions | Heat treatment conditions 1 | | Heat treatment conditions 2 | |
|---|---|---|---|---|---|---|---|---|---|---|---|
| | Polymer content (mass %) | Type | Molecular weight | Added amount (parts by mass) | Temperature (° C.) | Relative humidity (% RH) | Temperature (° C.) | Temperature (° C.) | Draw ratio | Temperature (° C.) | Draw ratio |
| Example 1 | 16 | PVP | 1,000,000 | 100 | 45 | 85 | 80 | 200 | 1.0 | 230 | 0.95 |
| Example 2 | 16 | PVP | 500,00 | 100 | 45 | 85 | 80 | 200 | 1.0 | 230 | 0.95 |
| Example 3 | 12 | PVP | 1,000,000 | 50 | 45 | 85 | 80 | 200 | 1.0 | 230 | 0.95 |
| Example 4 | 15 | PVP | 1,000,000 | 150 | 45 | 85 | 80 | 200 | 1.0 | 230 | 0.95 |
| Example 5 | 16 | PVP | 1,000,000 | 100 | 25 | 85 | 80 | 200 | 1.0 | 230 | 0.95 |
| Example 6 | 16 | PVP | 1,000,000 | 100 | 80 | 85 | 80 | 200 | 1.0 | 230 | 0.95 |
| Example 7 | 16 | PVP | 1,000,000 | 100 | 45 | 85 | 50 | 200 | 1.0 | 230 | 0.95 |
| Example 8 | 13 | PVP | 1,000,000 | 44 | 45 | 85 | 80 | 200 | 1.0 | 230 | 0.95 |
| Example 9 | 17 | PVP | 1,000,000 | 55 | 45 | 85 | 80 | 200 | 1.0 | 230 | 0.95 |
| Example 10 | 16 | PVP | 1,000,000 | 45 | 45 | 85 | 80 | 200 | 1.0 | 230 | 0.95 |
| Example 11 | 15 | PVP | 1,000,000 | 36 | 45 | 85 | 80 | 200 | 10 | 230 | 0.95 |
| Example 12 | 18 | PVP | 1,000,000 | 50 | 45 | 85 | 80 | 200 | 1.0 | 230 | 0.95 |
| Example 13 | 16 | PVP | 200,000 | 100 | 45 | 85 | 80 | 200 | 1.0 | 230 | 0.95 |
| Example 14 | 16 | PVP | 2,000,000 | 100 | 45 | 85 | 80 | 200 | 1.0 | 230 | 0.95 |
| Example 15 | 16 | PVP | 1,000,000 | 100 | 45 | 85 | 80 | 80 | 1.0 | 230 | 0.95 |
| Example 16 | 16 | PVP | 1,000,000 | 100 | 45 | 85 | 80 | 120 | 1.0 | 230 | 0.95 |
| Example 17 | 16 | PVP | 1,000,000 | 100 | 45 | 85 | 80 | 200 | 1.0 | 280 | 0.95 |
| Example 18 | 16 | PVP | 1,000,000 | 100 | 45 | 85 | 80 | 230 | 1.0 | 230 | 0.95 |
| Example 19 | 16 | PVP | 1,000,000 | 45 | 45 | 85 | 80 | 200 | 1.0 | 280 | 0.95 |
| Example 20 | 15 | PVP | 1,000,000 | 36 | 45 | 85 | 80 | 200 | 1.0 | 230 | 0.95 |
| Example 21 | 20 | PVP | 1,000,000 | 100 | 45 | 85 | 80 | 200 | 1.0 | 230 | 0.95 |
| Example 22 | 20 | PVP | 1,000,000 | 100 | 45 | 85 | 80 | 200 | 1.0 | 230 | 0.90 |
| Comparative Example 1 | 16 | PVP | 10,000 | 100 | 45 | 85 | 80 | 200 | 1.0 | 230 | 0.95 |
| Comparative Example 2 | 40 | PVP | 10,000 | 400 | 45 | 85 | 80 | 200 | 1.0 | 230 | 0.95 |
| Comparative Example 3 | 16 | PVP | 40,000 | 100 | 45 | 85 | 80 | 200 | 1.0 | 230 | 0.95 |
| Comparative Example 4 | 28 | PVP | 1,000,000 | 250 | 45 | 85 | 80 | 200 | 1.0 | 230 | 0.95 |
| Comparative Example 5 | 28 | PEG | 300 | 250 | 10 | 85 | 80 | 200 | 1.0 | 230 | 0.95 |
| Comparative Example 6 | 16 | PVP | 1,000,000 | 33 | 45 | 85 | 80 | 200 | 1.0 | 230 | 0.95 |
| Comparative Example 7 | 16 | PVP | 1,000,000 | 100 | 45 | 85 | 80 | 200 | 1.0 | 200 | 0.95 |

TABLE 2

| | Properties of porous film | | | | | | | | | | |
|---|---|---|---|---|---|---|---|---|---|---|---|
| | Hydrophilic polymer content (parts by mass) | Thickness (mm) | Gurley air permeability (sec/100 ml) | Elongation at break (%) MD | Elongation at break (%) TD | Thermal shrinkage rate (%) MD | Thermal shrinkage rate (%) TD | Electrolyte stability | Alternating current resistance (Ωcm²) | Electrolyte retention rate (%) | Comprehensive evaluation 1 | Comprehensive evaluation 2 |
| Example 1 | 30 | 15 | 10 | 11 | 15 | 0.3 | 0.1 | ○ (1%) | 0.3 | 431 | ◎ | ○ |
| Example 2 | 26 | 14 | 15 | 11 | 16 | 0.3 | 0.2 | ○ (1%) | 0.4 | 415 | ◎ | ○ |
| Example 3 | 15 | 15 | 9 | 12 | 15 | 0.2 | 0.1 | ○ (0%) | 0.5 | 402 | ○ | ○ |
| Example 4 | 41 | 15 | 12 | 9 | 11 | 0.5 | 0.3 | Δ (3%) | 0.3 | 467 | Δ | Δ |
| Example 5 | 16 | 13 | 9 | 12 | 17 | 0.2 | 0.1 | ○ (0%) | 0.5 | 413 | ○ | ○ |
| Example 6 | 46 | 10 | 45 | 9 | 12 | 0.7 | 0.3 | Δ (4%) | 0.6 | 481 | Δ | Δ |
| Example 7 | 30 | 12 | 25 | 12 | 17 | 0.2 | 0.1 | ○ (1%) | 0.4 | 420 | ◎ | ○ |
| Example 8 | 12 | 15 | 10 | 13 | 16 | 0.2 | 0.1 | ○ (0%) | 0.7 | 401 | X *1 | ○ |
| Example 9 | 20 | 25 | 180 | 23 | 28 | 0.1 | 0.1 | ○ (0%) | 1.1 | 530 | X *1 | ◎ |
| Example 10 | 18 | 25 | 110 | 16 | 23 | 0.2 | 0.1 | ○ (0%) | 1.4 | 556 | X *1 | ◎ |
| Example 11 | 17 | 20 | 220 | 19 | 26 | 0.1 | 0.0 | ○ (0%) | 1.5 | 504 | X *1 | ◎ |
| Example 12 | 18 | 19 | 285 | 25 | 30 | 0.1 | 0.0 | ○ (0%) | 1.6 | 460 | X *1 | ○ |
| Example 13 | 17 | 15 | 25 | 12 | 16 | 0.4 | 0.2 | Δ (2%) | 0.6 | 408 | Δ | Δ |
| Example 14 | 47 | 17 | 31 | 13 | 19 | 0.2 | 0.1 | Δ (2%) | 0.6 | 493 | Δ | Δ |
| Example 15 | 30 | 15 | 10 | 4 | 9 | 0.3 | 0.1 | ○ (1%) | 0.3 | 431 | ◎ | ○ |
| Example 16 | 30 | 15 | 10 | 7 | 9 | 0.3 | 0.1 | ○ (1%) | 0.3 | 431 | ◎ | ○ |
| Example 17 | 30 | 15 | 10 | 11 | 15 | 0.1 | 0.0 | ○ (1%) | 0.3 | 431 | ◎ | ○ |
| Example 18 | 30 | 15 | 10 | 3 | 7 | 0.3 | 0.1 | ○ (1%) | 0.3 | 431 | ◎ | ○ |
| Example 19 | 18 | 25 | 110 | 16 | 23 | 0.0 | 0.0 | ○ (0%) | 1.4 | 556 | X *1 | ◎ |

TABLE 2-continued

| | Properties of porous film | | | | | | | | | | |
|---|---|---|---|---|---|---|---|---|---|---|---|
| | Hydrophilic polymer content (parts by mass) | Thickness (mm) | Gurley air permeability (sec/ 100 ml) | Elongation at break (%) | | Thermal shrinkage rate (%) | | Electrolyte stability | Alternating current resistance ($\Omega cm^2$) | Electrolyte retention rate (%) | Comprehensive evaluation 1 | Comprehensive evaluation 2 |
| | | | | MD | TD | MD | TD | | | | | |
| Example 20 | 16 | 20 | 95 | 35 | 30 | 0.1 | 0.1 | ○ (0%) | 1.2 | 525 | X *1 | ◎ |
| Example 21 | 24 | 15 | 10 | 20 | 25 | 0.1 | 0.0 | ○ (1%) | 0.2 | 471 | ◎ | ○ |
| Example 22 | 24 | 16 | 10 | 21 | 27 | 0.1 | −0.1 | ○ (1%) | 0.2 | 471 | ◎ | ○ |
| Comparative Example 1 | 2 | 15 | 56 | 13 | 16 | 0.3 | 0.2 | ○ (0%) | 1.0 | 312 | X | X |
| Comparative Example 2 | 27 | 12 | 10 | 7 | 9 | 1.2 | 0.5 | X (15%) | 0.5 | 405 | X | X |
| Comparative Example 3 | 5 | 15 | 35 | 11 | 14 | 0.2 | 0.1 | Δ (1%) | 0.9 | 315 | X | X |
| Comparative Example 4 | 6 | 17 | 84 | 19 | 23 | 0.8 | 0.4 | X (12%) | 0.9 | 520 | X | X |
| Comparative Example 5 | 0 | 25 | 89 | 20 | 25 | 0.1 | 0.0 | ○ (0%) | 2.1 | 361 | X | X |
| Comparative Example 6 | 9 | 20 | 350 | 28 | 31 | 0.1 | 0.0 | ○ (0%) | 1.9 | 397 | X | X |
| Comparative Example 7 | 30 | 15 | 10 | 13 | 18 | 1.1 | 0.7 | Δ (4%) | 0.3 | 431 | X | X |

*1 Practically useful for lithium ion batteries

INDUSTRIAL APPLICABILITY

It is possible to obtain a porous film that is very high in heat resistance and has a small thickness, high air permeability, and high affinity to electrolyte solutions, thereby serving effectively as separators with high heat resistance and low electrical resistance that are suitable for capacitors such as lithium ion capacitor and electric double layer capacitor, and for batteries such as lithium ion secondary battery.

The invention claimed is:

1. A porous aromatic polyamide film comprising aromatic polyamide and a hydrophilic polymer, wherein the hydrophilic polymer accounts for 12 to 50 parts by mass per 100 parts by mass of the aromatic polyamide, Gurley air permeability is 0.5 to 300 seconds/100 ml, thermal shrinkage rate is −0.5 to 1.0% at 200° C. in both length and width directions, and the hydrophilic polymer is polyvinyl pyrrolidone having a weight-average molecular weight of 500,000 to 2,000,000, wherein the aromatic rings with para orientation account for 80 mol % or more of the total aromatic rings in the aromatic polyamide.

2. The film according to claim 1, wherein the hydrophilic polymer accounts for 15 to 50 parts by mass per 100 parts by mass of the aromatic polyamide, the Gurley air permeability being 0.5 to 100 seconds/100 ml.

3. The film according to claim 2, having a thickness of 2 to 30 μm.

4. The film according to claim 2, having an electrolyte retention rate of 400 to 700%.

5. A separator for capacitors comprising a porous aromatic polyamide film according to claim 2.

6. The film according to claim 1, having a thickness of 2 to 30 μM.

7. The film according to claim 6, having an electrolyte retention rate of 400 to 700%.

8. A separator for capacitors comprising a porous aromatic polyamide film according to claim 6.

9. The film according to claim 1, having an electrolyte retention rate of 400 to 700%.

10. A separator for capacitors comprising a porous aromatic polyamide film according to claim 9.

11. A separator for capacitors comprising a porous aromatic polyamide film according to claim 1.

12. A capacitor comprising the separator according to claim 11.

13. A separator for batteries comprising a porous aromatic polyamide film according to claim 1.

14. A battery comprising the separator according to claim 13.

* * * * *